(12) United States Patent
Maeda et al.

(10) Patent No.: US 11,084,083 B2
(45) Date of Patent: Aug. 10, 2021

(54) JOINING METHOD FOR MEMBERS AND JOINT BODY

(71) Applicant: KOBE STEEL, LTD., Hyogo (JP)

(72) Inventors: Yasuhiro Maeda, Kobe (JP); Toru Hashimura, Kobe (JP); Ryohei Yukishige, Kobe (JP)

(73) Assignee: Kobe Steel, Ltd., Hyogo (JP)

(*) Notice: Subject to any disclaimer, the term of this patent is extended or adjusted under 35 U.S.C. 154(b) by 75 days.

(21) Appl. No.: 16/472,303

(22) PCT Filed: Dec. 28, 2017

(86) PCT No.: PCT/JP2017/047274
§ 371 (c)(1),
(2) Date: Jun. 21, 2019

(87) PCT Pub. No.: WO2018/131512
PCT Pub. Date: Jul. 19, 2018

(65) Prior Publication Data
US 2019/0374994 A1 Dec. 12, 2019

(30) Foreign Application Priority Data
Jan. 12, 2017 (JP) .............................. JP2017-003591

(51) Int. Cl.
*B21D 39/06* (2006.01)
*B60R 19/24* (2006.01)
*B62D 65/16* (2006.01)

(52) U.S. Cl.
CPC .............. *B21D 39/06* (2013.01); *B60R 19/24* (2013.01); *B62D 65/16* (2013.01)

(58) Field of Classification Search
CPC .... B21D 17/025; B21D 39/06; B21D 41/028; B23P 11/005; B60R 19/24; B60R 19/023; B62D 65/16
See application file for complete search history.

(56) References Cited

U.S. PATENT DOCUMENTS

| 8,266,782 B2* | 9/2012 | Miyazaki | B21D 39/06 29/523 |
| 2018/0015527 A1* | 1/2018 | Maeda | B21D 39/044 |
| 2018/0272414 A1* | 9/2018 | Maeda | B21D 53/88 |

FOREIGN PATENT DOCUMENTS

| JP | S51-133170 A | 11/1976 |
| JP | H09-192760 A | 7/1997 |

OTHER PUBLICATIONS

International Search Report issued in PCT/JP2017/047274; dated Apr. 3, 2018.

* cited by examiner

*Primary Examiner* — Christopher J Besler
*Assistant Examiner* — Christine Bersabal
(74) *Attorney, Agent, or Firm* — Studebaker & Brackett PC (57) ABSTRACT

In a joining method for members, a tube body having a center axis L, a wall surface body having a hole portion through which the tube body can be inserted, and an elastic body that can be inserted in the tube body are prepared. The tube body has an inner rib extending in a direction of the center axis so as to partition an inside thereof, and the inner rib has notches cut from a lower end of the inner rib in the direction of the center axis. Next, the tube body is inserted through the hole portion in the wall surface body, and the elastic body is inserted into internal spaces partitioned by the inner rib of the tube body. Furthermore, the elastic body is compressed in the direction of the center axis of the tube body and expanded outward in a radial direction with respect to the center axis, whereby an end of the tube body is expanded and deformed to be joined to the wall surface body by press-fitting.

10 Claims, 9 Drawing Sheets

JOINING METHOD FOR MEMBERS AND JOINT BODY

CROSS-REFERENCE TO RELATED APPLICATIONS

This is a national phase application in the United States of International Patent Application No. PCT/JP2017/047274 with an international filing date of Dec. 28, 2017, which claims priority of Japanese Patent Application No. 2017-003591 filed on Jan. 12, 2017 the contents of which are incorporated herein by reference.

TECHNICAL FIELD

The present disclosure relates to a joining method for members and a joint body.

BACKGROUND ART

Metals having low specific gravity and high strength, called high tension steel, are used to reduce the weight and improve safety of automobiles. High tension steel is effective for weight reduction and safety improvement, but is heavier than low specific gravity materials such as aluminum. In addition, when high tension steel is used, problems such as a decrease in formability, an increase in forming load, and a decrease in dimensional accuracy occur because of the high strength. Recently, in order to solve these problems, extruded materials, cast products (die cast products), and press-formed products of aluminum alloys having lower specific gravity than steel are used for vehicle parts. Since the aluminum alloy has a low specific gravity, it is effective for weight reduction, but because of its low strength, its safety is poor. Therefore, it is often used for outer plate parts (press-formed products) or parts (extruded materials and die-cast materials) that need rigidity. The multi-materialization for using steel parts and aluminum alloy parts in appropriate positions in a vehicle as described above is effective for suppressing cost increase associated with weight reduction of the vehicle.

The problem with multi-materialization is joining between dissimilar metals such as between steel parts and aluminum parts. For example, JP S51-133170 A and JP H09-192760 A disclose a joining method for members which enables to join dissimilar metals to each other using an elastic body in multi-materialization. Specifically, in the joining method for these members, a tube member is inserted into a hole in a plate member, the elastic body is inserted into the interior of the tube member, and the tube member is expanded by compressing the elastic body to join the plate member and the tube member by press-fitting.

SUMMARY OF THE INVENTION

Problems to be Solved by the Invention

However, in the joining method for members disclosed in JP S51-133170 A and JP H09-192760 A, if the tube member (tube body) is provided with an inner rib, expansion of the tube is suppressed by the inner rib, and thus, it is considered that a joint body may not have sufficient joining strength. In particular, in JP S51-133170 A and JP H09-192760 A, there is no particular suggestion on the decrease in joining strength due to such an inner rib.

An embodiment of the present invention has been made under such circumstances, and an object thereof is to provide: a joining method for members with which, even when a tube body is provided with an inner rib, it is possible to provide joining strength substantially equal to that in the case where the tube body is not provided with the inner rib; and a joint body obtained by the method and having sufficient joining strength.

Means for Solving the Problems

A joining method for members according to an embodiment of the present invention includes: providing a tube body, a wall surface body having a hole portion through which the tube body can be inserted, and an elastic body which can be inserted into the tube body, the tube body having a center axis which vertically extends and an inner rib extending in a direction of the center axis so as to partition an inside of the tube body, the inner rib being provided with a notch formed by cutting a lower end of the inner rib in the direction of the center axis; inserting the tube body into the hole portion in the wall surface body; inserting the elastic body into an internal space partitioned by the inner rib of the tube body; and compressing the elastic body in the direction of the center axis of the tube body and expanding the elastic body outward in a radial direction with respect to the center axis, thereby expanding an inserted part of the tube body into the wall surface body to join the inserted part to the wall surface body by press-fitting.

According to this method, the tube body can be expanded uniformly by the elastic body, whereby a local load on the tube body can be reduced and local deformation can be prevented. With the method described above, the tube body and the wall surface body can be fitted with higher accuracy, that is, the joining strength can be more improved, as compared with other joining methods. Moreover, the inner rib provided to the tube body from a viewpoint of, for example, improving strength is provided with the notch in the lower end thereof. Thus, the inner rib is less likely to become resistance when the tube body is expanded, whereby the inserted part of the tube body can be sufficiently expanded. Therefore, sufficient joining strength substantially equal to that in the case where the tube body is not provided with the inner rib can be ensured.

The hole portion in the wall surface body may be subjected to a burring process so that a wall surface of the hole portion is raised in the direction of the center axis.

According to this method, the wall surface of the hole portion is raised by the burring process, whereby a joint area between the tube body and the wall surface body increases. Accordingly, the joining strength can be improved.

The hole portion raised by the burring process may have a chamfered surface.

According to this method, the tube body can be expanded more largely by the chamfered surface being provided in the hole portion. More specifically, the burring process with forming the chamfered surface enables the hole portion to be formed larger, compared with, for example, a burring process for simply raising the wall surface perpendicularly. Due to the hole portion being formed larger, the tube body can be expanded more largely. Therefore, the expanded part serving as a stopper can be formed larger, whereby the joining strength can be improved.

An upper edge of the wall surface of the hole portion raised by the burring process may have a straight part and a corner connected to the straight part, and the straight part may be raised to be higher than the corner.

According to this method, the straight part is formed to be higher than the corner. Therefore, the joint area between the tube body and the wall surface body at the straight part can be made larger than the joint area at the corner. From the viewpoint of rigidity, the tube body is hardly expanded at the corner and is easily expanded at the straight part. Therefore, the joining strength can be efficiently improved by increasing the joint area at the straight part where the tube body is easily expanded.

The notch may have a height equal to or greater than the height of the upper edge of the wall surface of the hole portion raised by the burring process.

According to this method, the height of the notch is equal to or greater than the height (burring height) of the upper edge of the wall surface of the hole portion, whereby the lower end (inserted part) of the tube body can be expanded largely to a burring height. Therefore, the tube body can be expanded and joined by press-fitting to the entire hole portion subjected to the burring process, whereby the joining strength can be improved. Here, the burring height refers to the height of the upper edge of the hole portion raised by the burring process.

The notch may be provided at a connection portion between the inner rib and an inner surface of the tube body.

According to this method, the notch is provided to the inner rib at the connection portion between the inner rib and the inner surface of the tube body, that is, the inner rib and the inner surface of the tube body are partially separated from each other at the connection portion, which can effectively prevent the inner rib from becoming resistance when the tube body is expanded. Therefore, the amount of expansion of the tube body can be increased, and the joining strength can be improved.

A joint body according to the embodiment of the present invention includes: a tube body that has a center axis extending vertically; and a wall surface body that has a hole portion through which the tube body can be inserted, wherein an inserted part of the tube body is expanded and joined to the wall surface body by press-fitting, and the inserted part of the tube body is provided with an inner rib extending in a direction of the center axis so as to partition an inside of the tube body, and the inner rib is provided with a notch formed by cutting a lower end of the inner rib in the direction of the center axis.

According to this configuration, even if the joint body is provided with the inner rib as described above, sufficient joining strength substantially equal to that in the case where the joint body is not provided with the inner rib can be obtained, due to the formation of the notch in the inner rib.

According to the embodiment of the present invention, even if the tube body of the joint body is provided with the inner rib, sufficient joining strength substantially equal to that in the case where the tube body of the joint body is not provided with the inner rib can be obtained, due to the formation of the notch in the inner rib.

MODE FOR CARRYING OUT THE INVENTION

An embodiment of the present invention will be described below with reference to the accompanying drawings.

Figure 1:
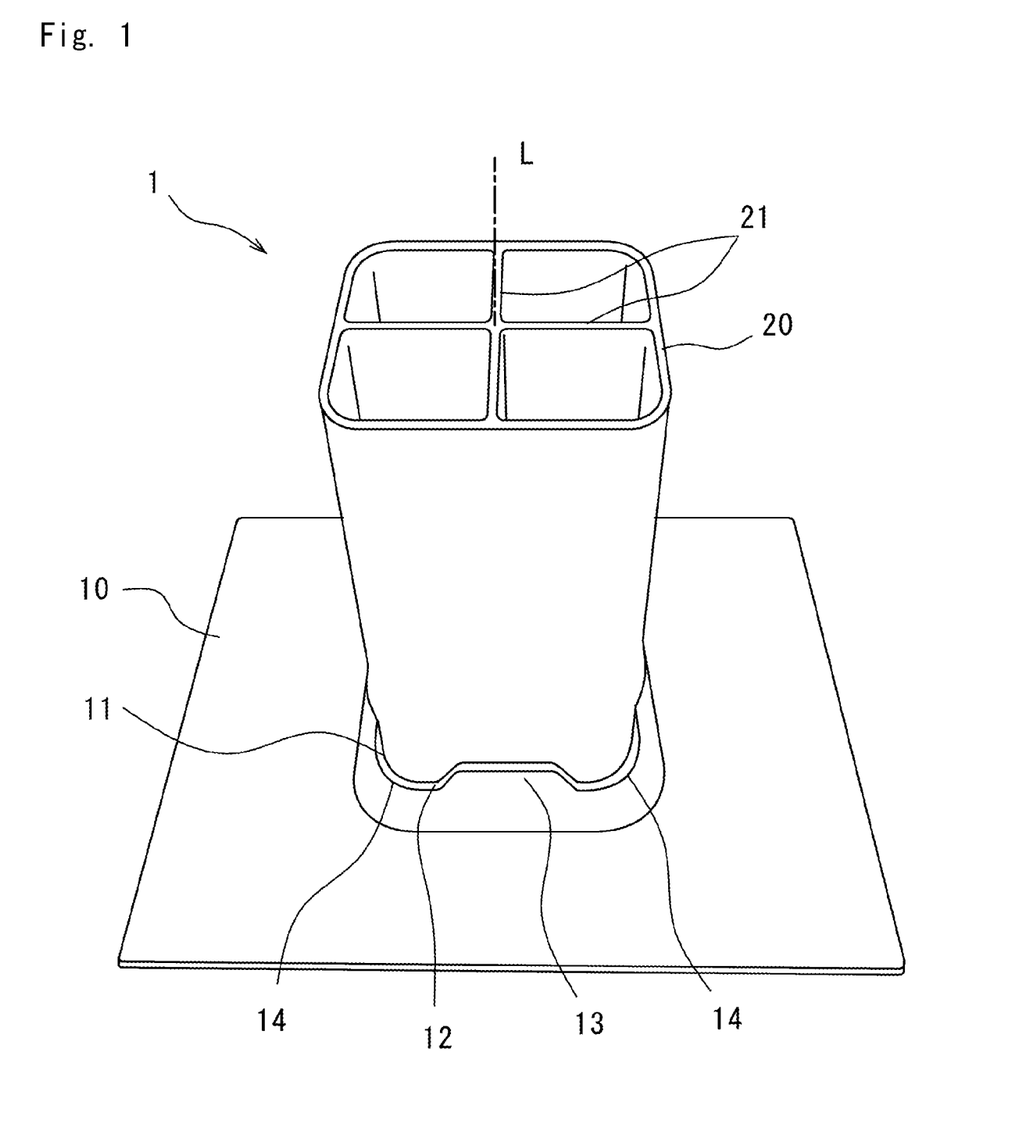
FIG. 1 is a perspective view of a joint body formed by a joining method for members according to an embodiment of the present invention, as viewed from above.

As illustrated in FIG. 1, a joining method for members according to the present embodiment is a method for joining a wall surface body 10 and a tube body 20 to each other to form a joint body 1. With the joining method for members, an inserted part of the tube body 20 into the wall surface body 10 expands outward in the radial direction with respect to a center axis L, and the tube body 20 is joined to a hole portion 11 in the wall surface body 10 by press-fitting. Thus, the joint body 1 is formed.

The wall surface body 10 is a plate member having a substantially rectangular hole portion 11 in a plan view (as viewed in the direction along the center axis L). The inner shape of the hole portion 11 is preferably similar to the outer shape of the tube body 20 in a plan view, and is preferably as small as possible within a range in which the tube body 20 can be inserted. The hole portion 11 is subjected to a burring process, that is, the wall surface of the hole portion 11 is raised in the direction of the center axis L (upward). In particular, a straight part 13 of an edge (upper edge) 12 of the hole portion 11 is raised higher than a corner 14 by the burring process. The wall surface body 10 as described above is formed from, for example, a metal member made of high tension steel or an aluminum alloy, and may be a part of a mounting plate of a bumper system mounted on a vehicle.

Figure 2:
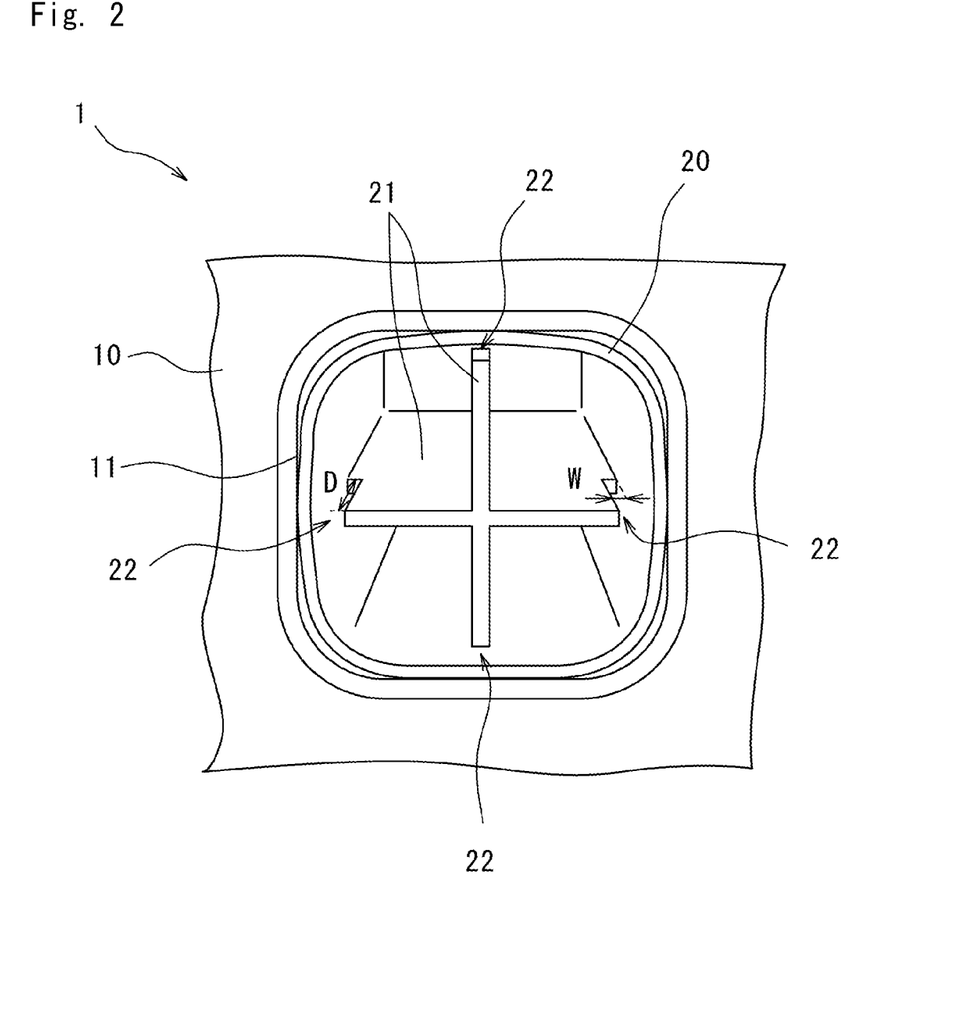
FIG. 2 is a perspective view of the joint body illustrated in FIG. 1 as viewed from below.

The tube body 20 extends in the direction of the center axis L (vertical direction), and has a substantially rectangular cross-section orthogonal to the center axis L. A cross-shaped inner rib 21 is provided inside the tube body 20 as viewed in the direction of the center axis L, and the inner space of the tube body 20 is partitioned into four by the inner rib 21. Further, as illustrated in FIG. 2, the inner rib 21 extends from the upper end to the lower end of the tube body 20, and has a notch 22 formed by cutting the lower end in the direction of the center axis L. The notch 22 is provided in the inner rib 21 at a connection portion with the inner surface of the tube body 20. In the present embodiment, there are four connection portions, and therefore, four notches 22 are provided on the four connection portions, respectively. The depth (height) D of the notch 22 is preferably equal to or greater than the rising height (hereinafter referred to as a burring height) of the edge 12 of the hole portion 11 of the wall surface body 10 as described later. The width W of the notch 22 is preferably small, but may be equal to the entire inner width of the tube body 20. In other words, the state in which the notch 22 having a width equal to the entire inner width of the tube body 20 is provided means the state in which the inner rib 21 is completely cut from the end to the position with the depth D. Such a configuration has an advantage of being capable of reducing a peak load when the joint body 1 receives an external force. The tube body 20 described above is, for example, an aluminum alloy extrusion and may be a part of a stay of a bumper system mounted on a vehicle.

The joining method for members according to the present embodiment for forming the joint body 1 illustrated in FIGS. 1 and 2 will be described sequentially from a first step to a seventh step with reference to FIGS. 3A to 3G.

Figure 3A:
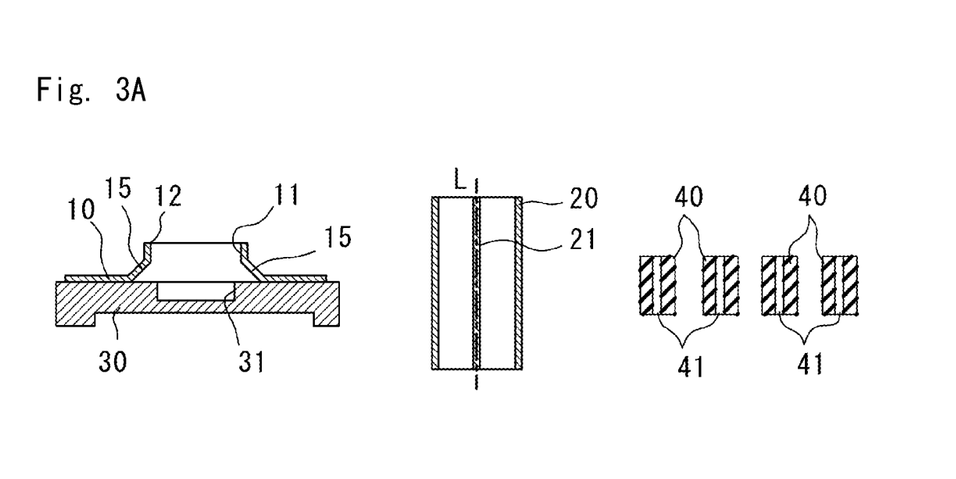
FIG. 3A is a view illustrating a first step of the joining method for members according to the embodiment.

As illustrated in FIG. 3A, in the first step, the wall surface body 10 mounted on a mounting table 30, the tube body 20, and an elastic body 40 are provided. The upper surface of the mounting table 30 is flat, and a counterbore 31 is provided in the center of the upper surface. The counterbore 31 is similar in shape to the outer shape of the tube body 20 in a plan view, and is formed slightly smaller than the outer shape of the tube body 20. Further, the hole portion 11 has a chamfered surface 15 formed by the above-described burring process. The formation angle of the chamfered surface 15 is generally 45 degrees, and in the present embodiment, it is illustrated as 45 degrees, but the formation angle may assume any value. Note that the inner rib 21 of the tube body 20 provided with the notch 22 (see FIGS. 1 and 2) as described above is not illustrated in FIG. 3A, because FIG. 3A is a sectional view. The elastic body 40 is made of an elastic material such as urethane rubber, chloroprene rubber, CNR rubber (chloroprene rubber+nitrile rubber), or silicone rubber. Four elastic bodies 40 are provided corresponding to the number of partitioned internal spaces of the tube body 20. Each elastic body 40 has a cylindrical shape of a size allowing insertion into the tube body 20, and has a longitudinally extending through hole 41 at the center.

Figure 3B:
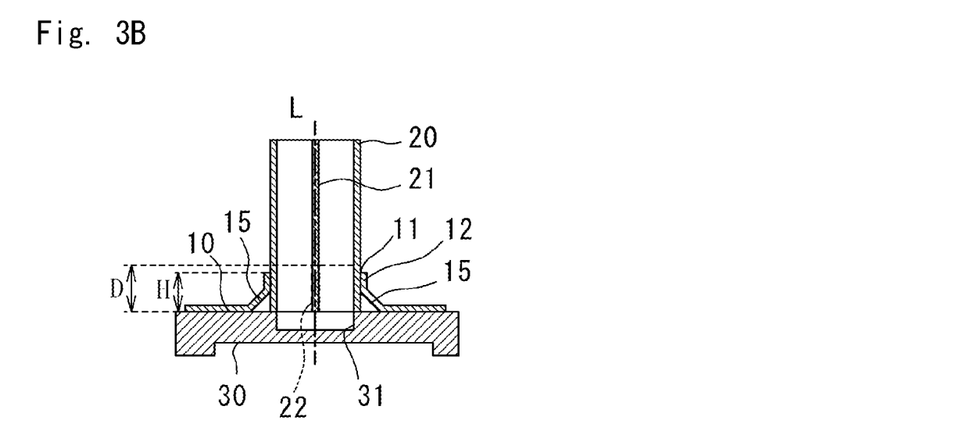
FIG. 3B is a view illustrating a second step of the joining method for members according to the embodiment.

As illustrated in FIG. 3B, in the second step, the tube body 20 is inserted into the hole portion 11 in the wall surface body 10 and mounted on the mounting table 30. At this time, the tube body 20 is placed on the upper surface of the mounting table 30 without entering the counterbore 31 of the mounting table 30. In addition, the height D of the notch 22 illustrated in a hypothetical manner is slightly greater than the burring height H of the hole portion 11 in the wall surface body 10.

Figure 3C:
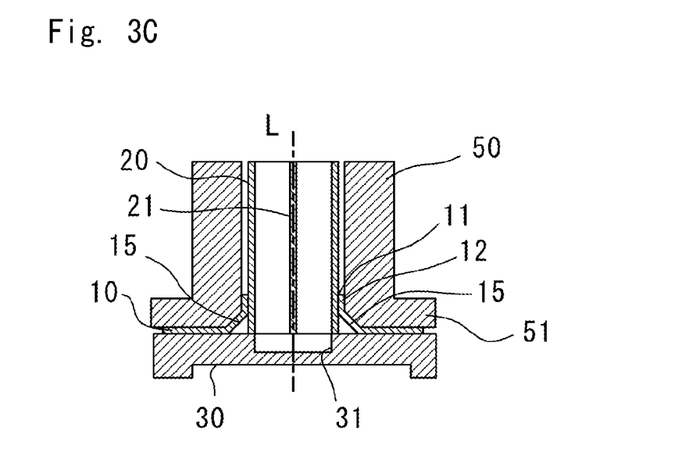
FIG. 3C is a view illustrating a third step of the joining method for members according to the embodiment.

As illustrated in FIG. 3C, in the third step, the wall surface body 10 is pressed against the mounting table 30 by a pad 50 and fixed. The pad 50 has a substantially rectangular tube shape similar to the outer shape of the tube body 20 in a plan view, and has a flange 51 for pressing the wall surface body 10 at the lower end. The pad 50 is mechanically connected to a pressing device (not illustrated) or the like, and can move up and down with a predetermined force enough for pressing the wall surface body 10 against the mounting table 30 and fixing the wall surface body 10.

Figure 3D:
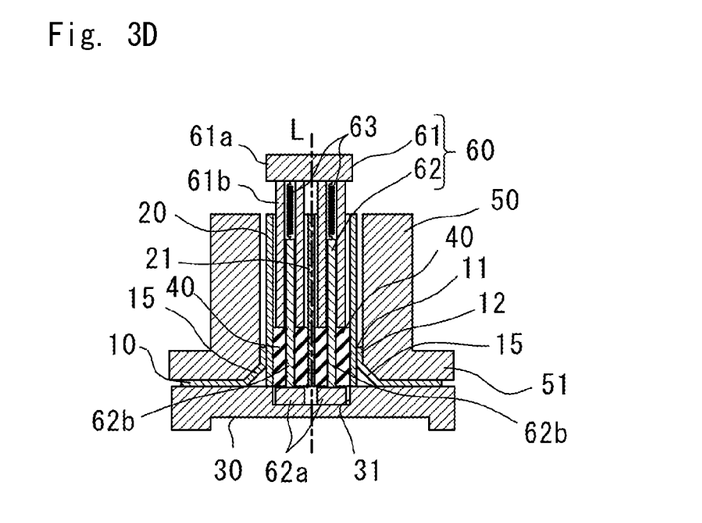
FIG. 3D is a view illustrating a fourth step of the joining method for members according to the embodiment.

As illustrated in FIG. 3D, in the fourth step, the elastic bodies 40 held and sandwiched by a pressing tool 60 are inserted into the tube body 20. The pressing tool 60 is composed of an upper member 61, a lower member 62, and a spring 63. The upper member 61 includes a cylindrical upper head 61a and four cylindrical receivers 61b extending downward from the upper head 61a. The lower member 62 includes four lower heads 62a of a size allowing insertion into the tube body 20, and rods 62b extending upward from the lower heads 62a. The lower heads 62a are disposed in the counterbore 31 in the mounting table 30. Each of the rods 62b passes through the through hole 41 of the elastic body 40 and is inserted into each of the receivers 61b. The spring 63 is disposed between the upper surface of the rods 62b and the lower surface of the upper head 61a, and the upper member 61 and the lower member 62 are biased away from each other by the spring 63. FIG. 3D which is a cross-sectional view illustrates only two of the four receivers 61b and only two of the four rods 62b. The fourth step may be performed before the second step. That is, the tube body 20 in which the pressing tool 60 has been inserted may be placed on the mounting table 30.

Figure 3E:
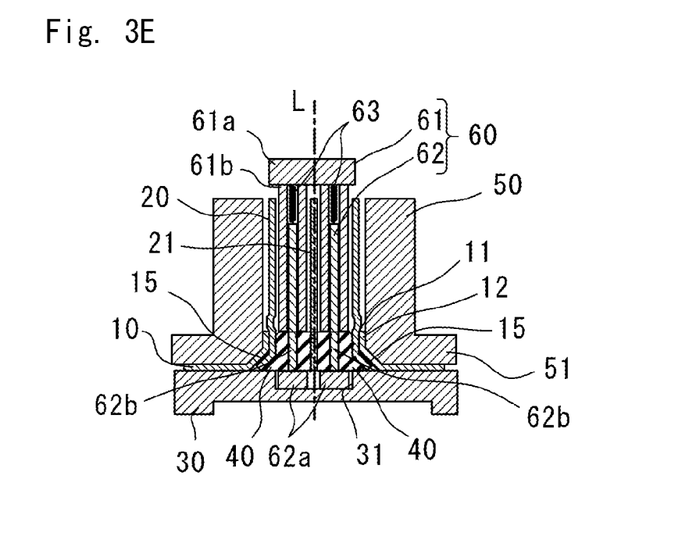
FIG. 3E is a view illustrating a fifth step of the joining method for members according to the embodiment.

As illustrated in FIG. 3E, in the fifth step, the upper head 61a of the upper member 61 is pressed downward against the biasing force of the spring 63, and the elastic bodies 40 are compressed in the direction of the center axis L of the tube body 20 via the pressing tool 60 and expanded outward in the radial direction with respect to the center axis L. Thus, the end of the tube body 20 is expanded and deformed to be joined to the wall surface body 10 by press-fitting. At this time, the tube body 20 is deformed along the chamfered surface 15 of the hole portion 11 in the wall surface body 10, and the upper part of the hole portion 11 in the wall surface body 10 is partially expanded. When the pressing force applied to the upper head 61a is removed after the tube body 20 expands, the pressing tool 60 and the elastic bodies 40 are restored to their original shapes (FIG. 3D) by the biasing force of the spring 63 and their own elastic force.

Figure 3F:
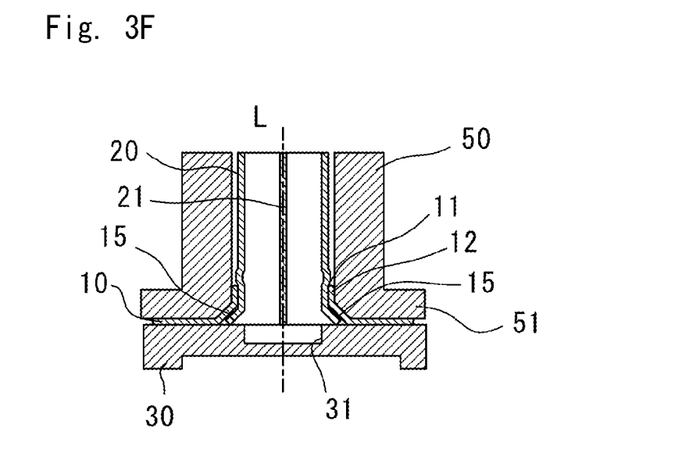
FIG. 3F is a view illustrating a sixth step of the joining method for members according to the embodiment.

As illustrated in FIG. 3F, in the sixth step, the pressing tool 60 and the elastic bodies 40 restored to their original shapes (FIG. 3D) are taken out from the tube body 20. After they are taken out, the tube body 20 is still plastically deformed, so that the expanded shape is maintained and the joining by press-fitting applied in the fifth step is not released.

Figure 3G:
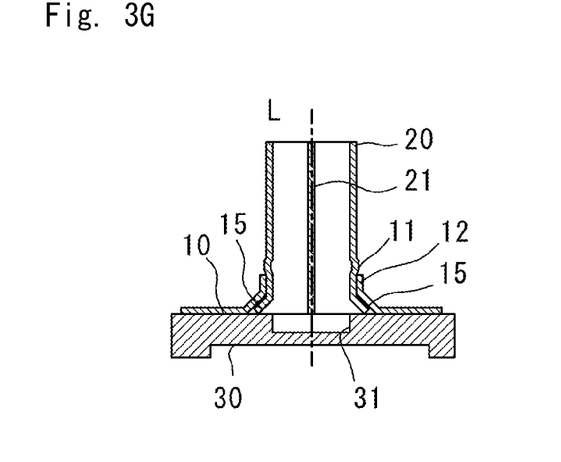
FIG. 3G is a view illustrating a seventh step of the joining method for members according to the embodiment.

As illustrated in FIG. 3G, in the seventh step, the pressing force applied to the pad 50 is released, and the pad 50 is removed. In this way, the joint body 1 in which the tube body 20 and the wall surface body 10 are joined is obtained.

The joint body 1 obtained as described above has the following effects.

According to the present embodiment, the tube body 20 can be expanded uniformly by the elastic bodies 40, whereby a local load on the tube body 20 can be reduced, and local deformation can be prevented. Therefore, the tube body 20 and the wall surface body 10 can be fitted with higher accuracy, that is, the joining strength can be more improved, as compared with other joining methods. Moreover, the inner rib 21 provided to the tube body 20 from a viewpoint of, for example, improving strength is provided with the notch 22 in the lower end thereof. Thus, the inner rib 21 is less likely to become resistance when the tube body 20 expands, whereby the inserted part of the tube body 20 can be sufficiently expanded. Therefore, sufficient joining strength substantially equal to that in the case where the tube body 20 is not provided with the inner rib 21 can be ensured.

Figure 4:
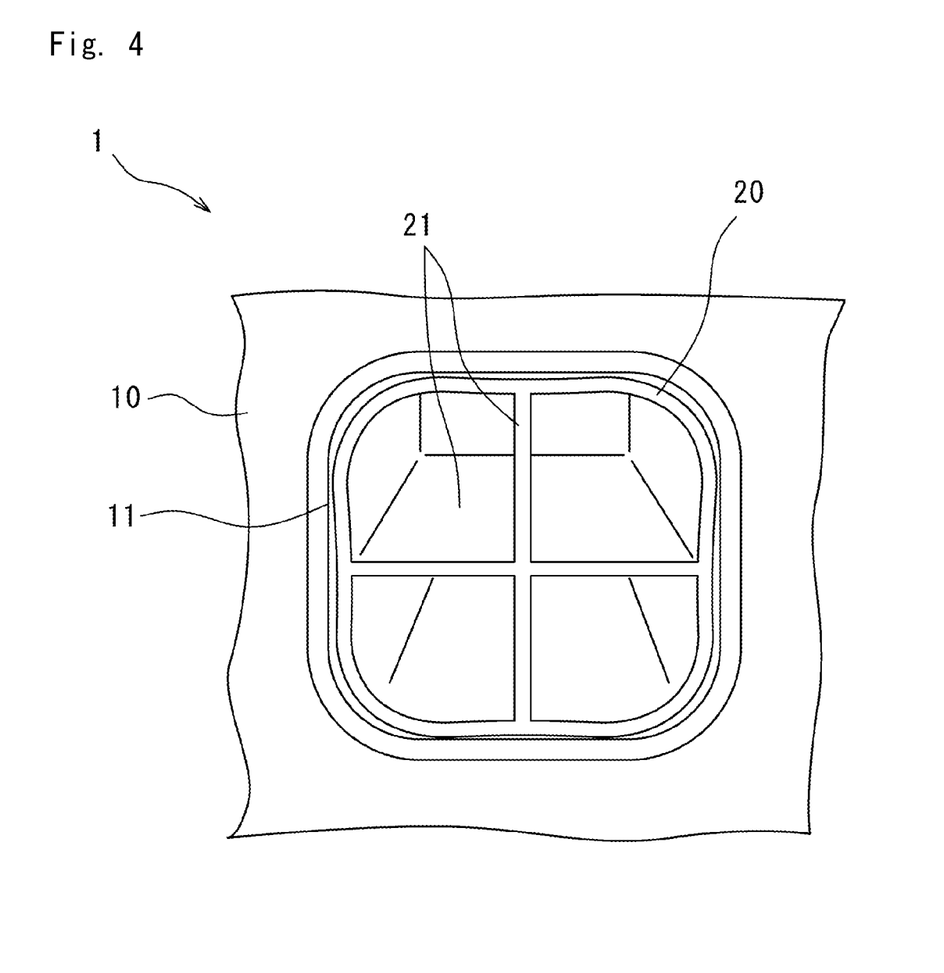
FIG. 4 is a perspective view illustrating a comparative example of the joint body illustrated in FIG. 2.

If the notch 22 is not provided in the inner rib 21 as illustrated in FIG. 4, the inner rib 21 becomes resistance when the tube body 20 is expanded during the joining process by press-fitting using the elastic bodies 40 as described above, and thus the tube body 20 is not sufficiently expanded. On the other hand, in the present embodiment, due to the inner rib 21 being provided to the tube body 20 as illustrated in FIG. 2, the resistance applied when the tube body 20 is expanded can be suppressed, whereby the tube body 20 can be expanded sufficiently.

Further, since the wall surface of the hole portion 11 of the wall surface body 10 is raised by the burring process, the joint area between the tube body 20 and the wall surface body 10 is increased, and the joining strength is improved.

Moreover, the tube body 20 can be expanded more largely by the chamfered surface 15 (see FIG. 3A) being provided in the hole portion 11. More specifically, the burring process for forming the chamfered surface 15 enables the hole portion 11 to be formed larger, compared with, for example, a burring process for simply raising the wall surface perpendicularly. Due to the hole portion 11 being formed larger, the tube body 20 can be expanded more largely. Therefore, the expanded part serving as a stopper can be formed larger, whereby the joining strength can be improved.

Further, the straight part 13 is formed higher than the corner 14 at the edge 12 of the hole portion 11 (see FIG. 1). Therefore, the joint area between the tube body 20 and the wall surface body 10 at the straight part 13 can be made larger than the joint area at the corner 14. From the viewpoint of rigidity, the tube body 20 is hardly expanded at the corner 14 and is easily expanded at the straight part 13. Therefore, the joining strength can be efficiently improved by increasing the joint area at the straight part 13 where the tube body 20 is easily expanded.

Further, since the height D of the notch 22 is equal to or greater than the burring height H of the hole portion (see FIG. 3B), the lower end (inserted part) of the tube body 20 can be expanded largely to the burring height. Therefore, the tube body 20 can be expanded and joined by press-fitting to the entire hole portion 11 subjected to the burring process, whereby the joining strength can be improved.

Further, the notch 22 is provided to the inner rib 21 at the connection portion between the inner rib 21 and the inner surface of the tube body 20, that is, the inner rib 21 and the inner surface of the tube body 20 are partially separated from each other at the connection portion, which can effectively prevent the inner rib 21 from becoming resistance when the tube body 20 is expanded. Therefore, the amount of expansion of the tube body 20 can be increased, and the joining strength can be improved.

The respective members used in the present embodiment may be modified in various ways. As described above, in the present embodiment, the joint body 1 is formed by using the mounting table 30 and the pressing tool 60. However, the mounting table 30 and the pressing tool 60 may not be used. Further, the hole portion 11 in the wall surface body 10 may not be burred, and the tube body 20 can be directly joined to the edge of the hole portion 11 by press-fitting. Moreover, the manner of the burring process is not particularly limited, and a rounded surface may be formed, in place of the chamfered surface in the present embodiment, by the burring process. Further, the shape of the inner rib 21 of the tube body 20 is not particularly limited, and may have a shape other than the cross shape.

Figure 5:
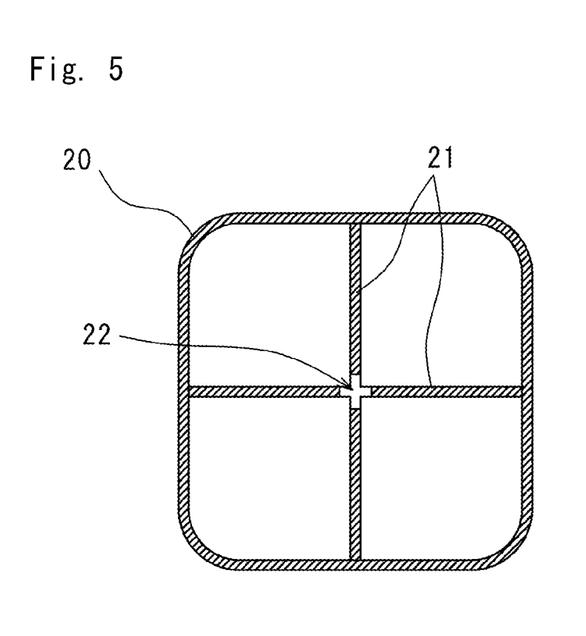
FIG. 5 is a bottom view illustrating a modification of a tube body.

As illustrated in FIG. 5, the notch 22 may be provided at the center of the cross-shaped inner rib 21 according to a modification of the present embodiment. Thus, the notch 22 can be formed only in one place.

Figure 6A:
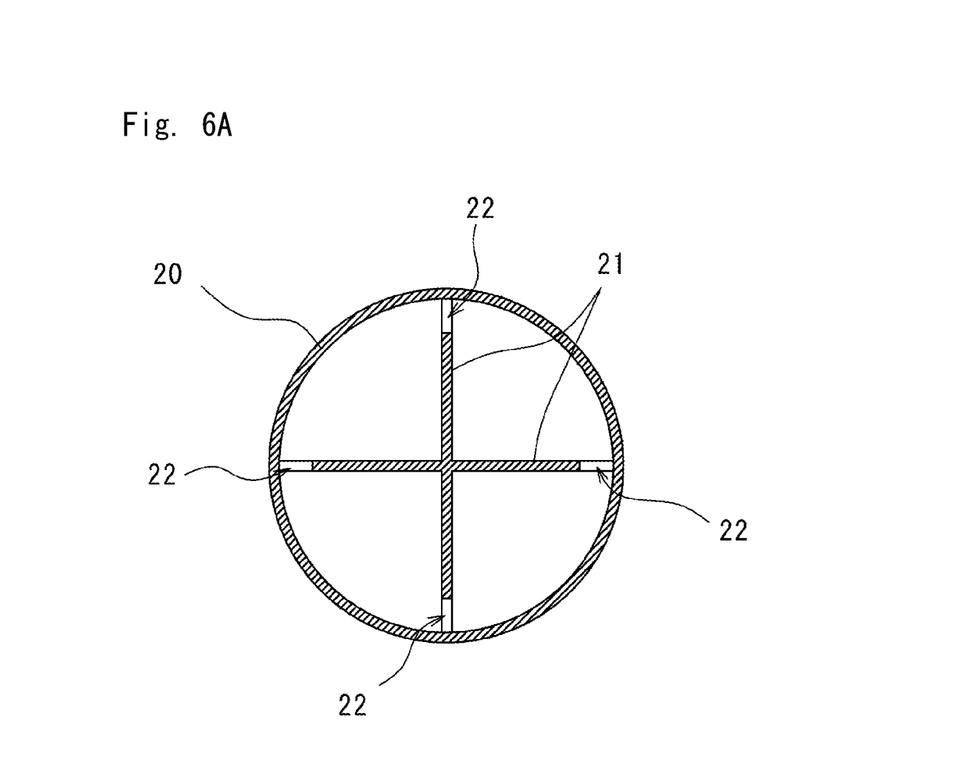
FIG. 6A is a bottom view illustrating another modification of the tube body.
Figure 6B:
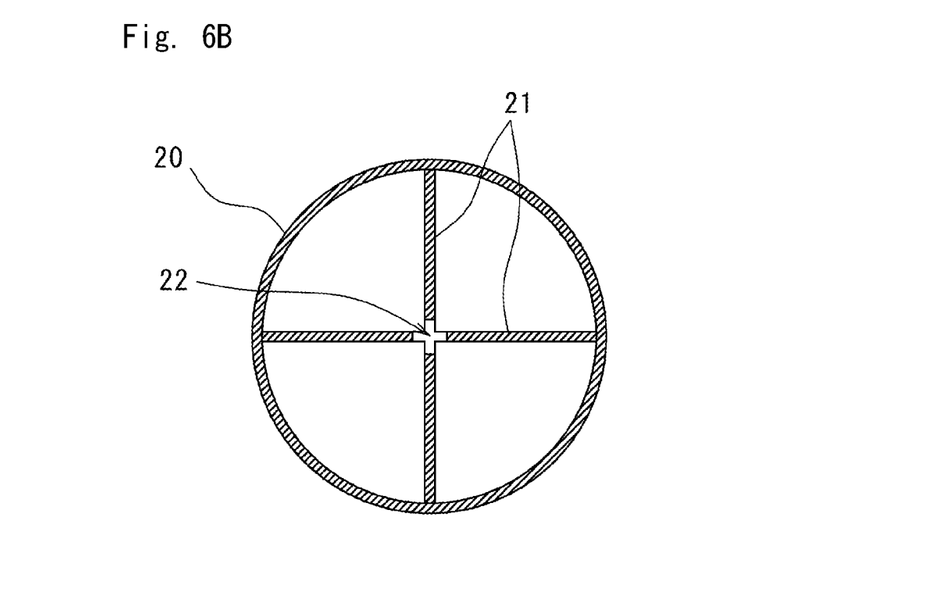
FIG. 6B is a bottom view illustrating another modification of the tube body.

As illustrated in FIGS. 6A and 6B, the cross-sectional shape of the tube body 20 may be circular, for example, according to another modification of the present embodiment. When the tube body 20 has a circular cross-section, the notch 22 can also be provided to the inner rib 21 at the connection portion (see FIG. 6A) between the inner rib 21 and the inner surface of the tube body 20 or at the center of the inner rib 21 (see FIG. 6B). As shown in the present modification, the shape of the tube body 20 and the position of the inner rib 21 are not particularly limited. The tube body 20 may have any shape and the inner rib 21 may be provided at any position.

While the specific embodiment of the present invention and its modifications have been described above, the present invention is not limited to the above embodiment, and can be modified in various ways without departing from the scope of the present invention. For example, a configuration obtained by appropriately combining the features of the respective embodiments may be provided as one embodiment of the present invention.

The invention claimed is:

1. A joining method for members, the method comprising:
providing a tube body, a wall surface body having a hole portion through which the tube body can be inserted, and an elastic body which can be inserted into the tube body, the tube body having a center axis which vertically extends and an inner rib extending in a direction of the center axis so as to partition an inside of the tube body, the inner rib being provided with a notch formed by cutting a lower end of the inner rib in the direction of the center axis;
inserting the tube body into the hole portion in the wall surface body;
inserting the elastic body into an internal space partitioned by the inner rib of the tube body; and
compressing the elastic body in the direction of the center axis of the tube body and expanding the elastic body outward in a radial direction with respect to the center axis, thereby expanding an inserted part of the tube body into the wall surface body to join the inserted part to the wall surface body by press-fitting.

2. The joining method for members according to claim 1, wherein the hole portion in the wall surface body is subjected to a burring process so that a wall surface of the hole portion is raised in the direction of the center axis.

3. The joining method for members according to claim 2, wherein the hole portion raised by the burring process has a chamfered surface.

4. The joining method for members according to claim 3, wherein
an upper edge of the wall surface of the hole portion raised by the burring process has a straight part and a corner connected to the straight part, and
the straight part is raised to be higher than the corner.

5. The joining method for members according to claim 3, wherein the notch has a height equal to or greater than a height of an upper edge of the wall surface of the hole portion raised by the burring process.

6. The joining method for members according to claim 3, wherein the notch is provided at a connection portion between the inner rib and an inner surface of the tube body.

7. The joining method for members according to claim 2, wherein
an upper edge of the wall surface of the hole portion raised by the burring process has a straight part and a corner connected to the straight part, and
the straight part is raised to be higher than the corner.

8. The joining method for members according to claim 2, wherein the notch has a height equal to or greater than a height of an upper edge of the wall surface of the hole portion raised by the burring process.

9. The joining method for members according to claim 2, wherein the notch is provided at a connection portion between the inner rib and an inner surface of the tube body.

10. The joining method for members according to claim 1, wherein the notch is provided at a connection portion between the inner rib and an inner surface of the tube body.

\* \* \* \* \*